INVENTORS
CONRAD H. COOKE
THOMAS C. HILL
BY
ATTORNEY

July 3, 1962   C. H. COOKE ET AL   3,042,343
INERTIAL CONTROL SYSTEM
Filed Oct. 25, 1956   3 Sheets-Sheet 3

INVENTORS
CONRAD H. COOKE
THOMAS C. HILL
BY
Julian C. Renfro
ATTORNEY

United States Patent Office 3,042,343
Patented July 3, 1962

3,042,343
INERTIAL CONTROL SYSTEM
Conrad H. Cooke, Linhigh, and Thomas C. Hill, Aberdeen, Md., assignors to Martin-Marietta Corporation, a corporation of Maryland
Filed Oct. 25, 1956, Ser. No. 618,320
19 Claims. (Cl. 244—76)

This invention relates to control apparatus for aircraft or the like, and more particularly to inertial control device adapted for use as an integral part of an aircraft control system for supplying forces to assist in controlling the flight of the aircraft.

In connection with the control of large high speed aircraft, for example, it is usually necessary to employ servo systems to supply the power necessary to move the flight controlling elements of the aircraft in response to manipulation of the controls by the pilot. In order for the pilot to have the proper "feel" of the aircraft, the control system is provided with synthetic force cue means for applying force to the controls of the aircraft. Conventionally, such synthetic force cue or force feedback is proportional to control deflection. However, this is not entirely satisfactory in some cases, and particularly where the aircraft is subject to compressibility effects or loading changes.

In the application of James L. Decker entitled "Aircraft Longitudinal Control System," Patent No. 3,002,714, and assigned to the assignee of the present invention, a new system is revealed in which the aircraft synthetic feel forces, for example, are a function of aircraft response. According to that system, the longitudinal control force is proportional to such parameters as normal acceleration, pitching acceleration, and change in airspeed from trim. Therefore, these force cues are independent of control deflection and are responsive to actual flight behavior, so that the pilot is provided with signals accurately reflecting the operation of the aircraft.

In a broader sense, an aircraft control system as described in the Decker application provides feel forces as a function of the long and short period pitch response of the aircraft. In addition, that system will function as a stability autopilot to correct deficiencies in the flying qualities of an aircraft.

The present invention relates to a means of mechanizing a portion of the above-described overall control system, and, insofar as the system relates to piloted aircraft, is concerned with the provision of stick forces to the pilot which are a function of normal and pitching accelerations. More particularly, the present device provides pilot feel for short period maneuvers, and in so doing, serves the additional advantage of being a hydro-mechanical stability autopilot. The new system includes a fluid actuator connected to the control system of the aircraft, and adapted to be actuated in response to the relative movements of an inertia element according to this invention. The arrangement is such that the accelerations of the aircraft of predetermined magnitudes and in predetermined directions will cause a relative movement of the inertia member and will result in the energization of the actuator. When so energized, the actuator exerts force upon the control system of the aircraft which moves the system in such a manner as to reduce accelerations.

This invention, therefore, is principally directed to an inertia device of a novel and improved hydro-mechanical type which may be incorporated in an aircraft control system of the type previously described, and adapted to respond substantially instantaneously, through a fluid power system, to exert compensatory control on an aircraft. The inertia device includes a built-in valve, so that the control response may be direct, and does not require intermediate servo mechanisms or the like, which might introduce time delay and inaccuracy in the control.

One of the specific features of the invention is the provision of an improved acceleration responsive control device which acts in response to both rotary and linear accelerations. The new device may be arranged to exert compensating control effort in predetermined proportions in response to rotary and linear accelerations, or, where desired, the device may be arranged to be non-responsive to linear accelerations. In some cases, more than one of the improved inertia devices may be incorporated in the control system to provide compensatory control for a large combination of acceleration forces.

Another feature of this invention is the provision of an inertia device that may be readily utilized in pilotless aircraft. The output from the hydraulic actuator that is associated with the present inertia device may be connected directly to the crank arm of a control surface of an aircraft, rather than to the pilot's control lever. In such instances, the inertia device will provide artificial stability for an aircraft that does not possess inherent stability, or it will augment the stability of an aircraft already possessing some stability.

In the event the pilotless aircraft were equipped with a guidance system, the guidance signals may be arranged to change the load factor command to the control system, but, as an alternative, the output from the inertia device may be arranged to operate a supplementary control surface of the airplane separate from the principal control surfaces operated in response to signals from the guidance system.

Although it is presently contemplated that the system of the invention will be used primarily in connection with the control of aircraft, either of the piloted or pilotless type, it will be understood that the invention may be incorporated in the control system of controllable movable objects of various types.

For a better understanding of the invention, reference should be made to the following detailed description and accompanying drawings, in which.

Figure 1:
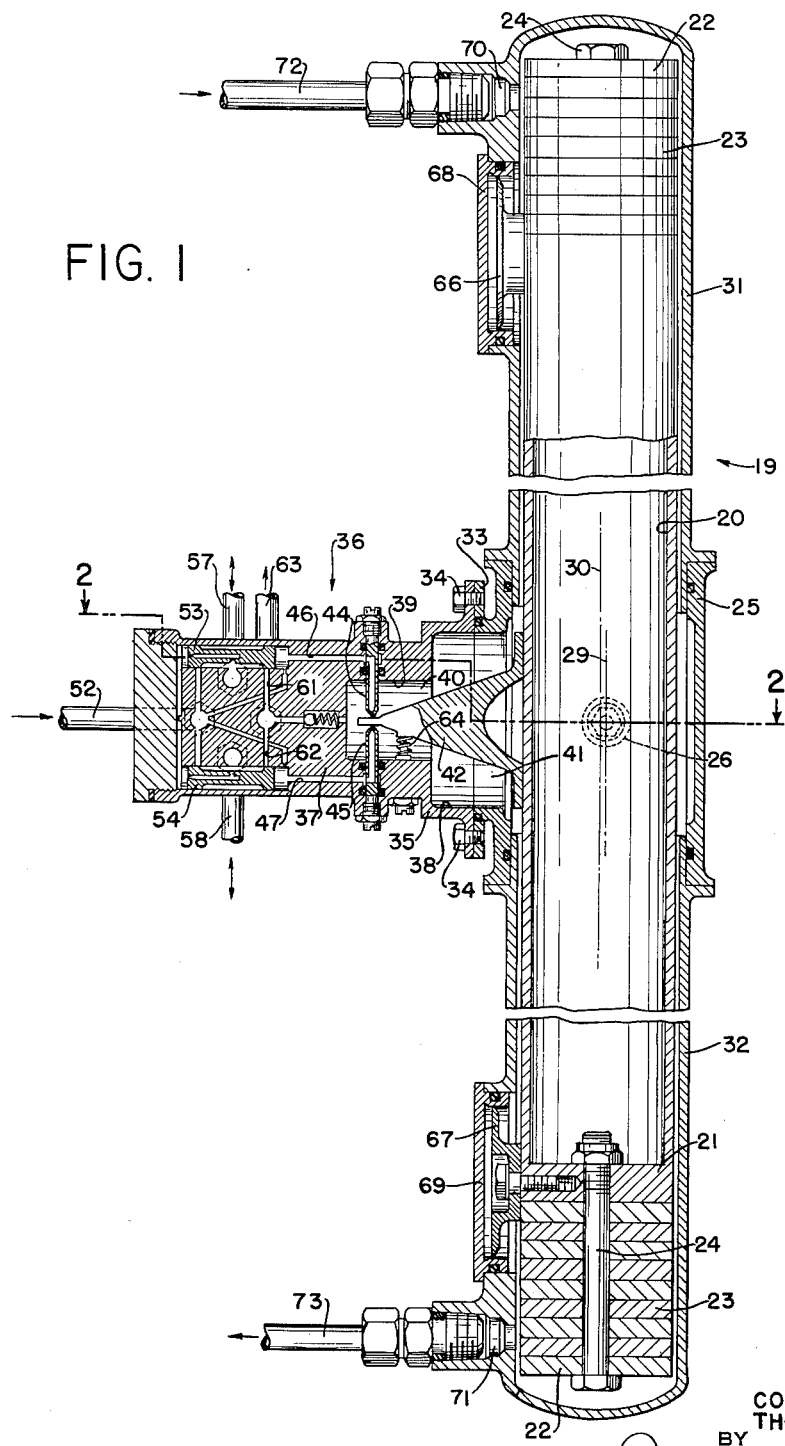
FIG. 1 is a longitudinal cross-sectional view of an improved inertia device constructed in accordance with the invention.

In the drawing, the numeral 10 (FIG. 4) designates a control lever of a type incorporated in conventional aircraft. The lever 10 is pivoted at 11 on the aircraft frame and is connected to a suitable control cable 12. The cable 12 is in turn connected to movable control surfaces of the aircraft, such as the elevators, not shown. Attached to the control lever 10 is a rod 13 acted upon by springs 14, 15 tending to maintain the lever 10 in a neutral position.

When an aircraft is in flight, it may be maneuvered by shifting the control lever 10 in appropriate directions. For the purpose of illustration, it may be assumed that clockwise pivotal movement of the control lever 10 will cause the aircraft to deviate upwardly from level straight line flight. Such deviation will, of course, cause acceleration forces to be applied to the wings and other parts of the aircraft.

To avoid excessive acceleration forces, which might otherwise be produced by large movements of the control lever 10, a hydraulic actuator 16 is mounted on the aircraft frame, as at 17, and has its movable member 18 attached to the control lever 10. The energization of the actuator 16 is controlled by an improved acceleration responsive inertia device 19, to be described, in such manner that the actuator 16 will resist movements of the control lever 10 tending to produce excessive acceleration forces in the aircraft.

Figure 3:
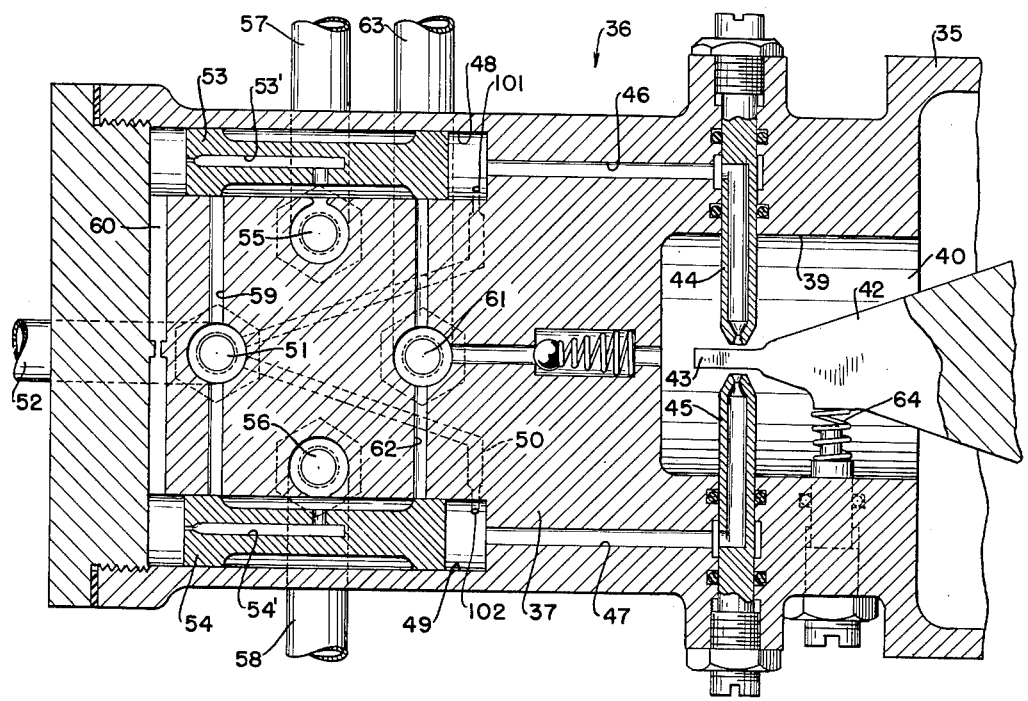
FIG. 3 is an enlarged fragmentary cross-sectional view of the device of FIG. 1.
Figure 2:
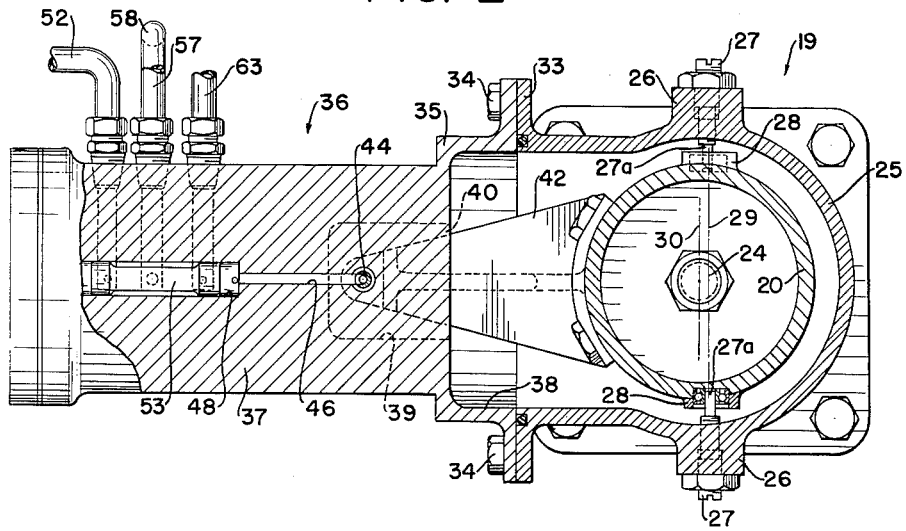
FIG. 2 is a cross-sectional view taken generally along line 2—2 of FIG. 1.

Referring now to FIGS. 1-3, the inertia device 19 of the invention comprises an elongated tubular member 20 having opposite end walls 21 upon which are mounted concentrated mass members 22. In the illustrated form of the invention, the concentrated mass members 22 comprise a plurality of washer-like members 23 of heavy material which are stacked in axial relation and secured to the end walls 21 of the tube 20 by means of bolts 24. Any number of washers 23 may be employed to obtain the desired concentration of mass.

Surrounding the midportion of the tube 20 is a central casing part 25 of generally cylindrical form and of slightly larger diameter than the tube 20. At opposite sides of the casing part 25 are bosses 26 in which are threadedly received pivot pins 27 having reduced end portions 27a.

As shown in FIG. 2, the elongated tube 20 is provided at a point midway between the concentrated masses 22 with a pair of outwardly extending bosses 28 having suitable anti-friction bearings for receiving the ends 27a of the pivot pins 27. In accordance with the invention, the center line of the bearings provided in the bosses 28 is aligned on an axis 29 which is slightly offset from the axis 30 on which the concentrated masses 22 are aligned. In the illustrated apparatus, the tube 20, which together with the concentrated masses 22 may be considered as an inertia element, is normally disposed in the aircraft so as to be in a vertical position when the aircraft is in normal level flight. The offset relationship of the axes 29 and 30 is such that the inertia member 20—24 tends to rotate in a counterclockwise direction, as viewed in FIG. 1, with respect to the casing part 25.

Secured to the upper and lower ends of the casing part 25, in axial alignment therewith, are tubular caps 31, 32. The caps 31, 32 are of slightly greater diameter than the inertia element 20—24 and normally surround the latter in spaced concentric relation, as indicated in FIG. 1. The caps 31, 32 are closed at their outer ends and are fitted in fluid-tight relation with the central casing part 25.

At one side of the central casing part 25 is an integral flanged boss 33 to which is secured, by means of bolts 34, the flanged end 35 of a valve assembly 36.

Figure 4:
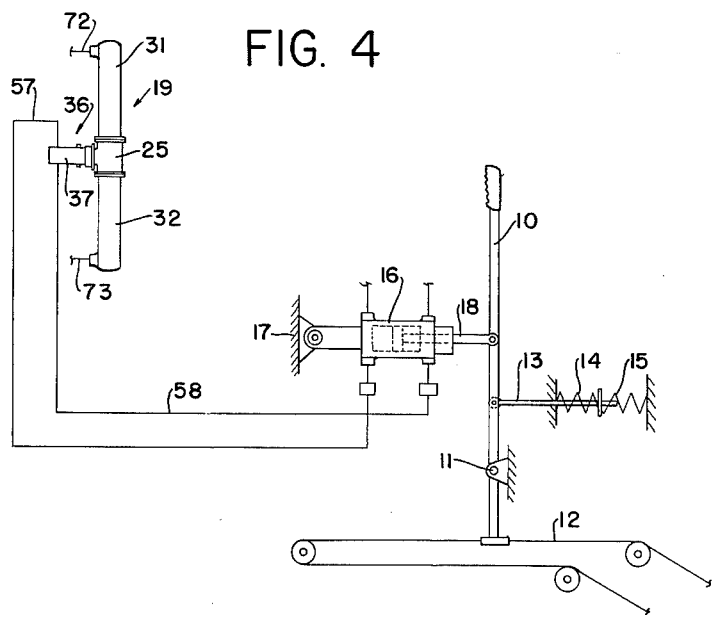
FIG. 4 is a simplified schematic representation of an aircraft control system incorporating the control apparatus of the invention.

As shown best in FIG. 4, the valve assembly 36 comprises a housing 37 extending outwardly from the flanged end 35 and having a recess 39 at its inner end communicating with the interior of the casing part 25 through openings 40, 41.

In accordance with the invention, the tube 20 mounts a valving element 42 in the form of an arm extending outwardly from the tube and projecting into the recess 39 in the valve housing 37. The valving element 42 has an end portion 43 with oppositely disposed valving surfaces thereon. Preferably, the valving surfaces are disposed in symmetrical relation to the plane passing through the pivot pins 27 at right angles to the axis 30 through the concentrated masses 22.

Mounted in the valve housing 37, above and below the valving end 43 of the arm 42, are fluid nozzles 44, 45, which are directed toward the valving surfaces of the arm 42 and are spaced apart a distance only slightly greater than the thickness of the valving end 43 of the arm.

Communicating with the nozzles 44, 45 are fluid passages 46, 47, which in turn communicate with the righthand ends of piston chambers 48, 49, respectively. Also communicating with the right-hand ends of the piston chambers 48, 49 through precise orifices 101, 102 at the inlet to each chamber are fluid passages 50 leading from a fluid inlet port 51. The arrangement is such that fluid under pressure entering the port 51 from a supply conduit 52 flows through the passages 50, into passages 46, 47 at reduced pressure and through the nozzles 44, 45, there being sufficient separation between the valving end 43 of arm 42 and the ends of the nozzles to permit the flow of fluid out of one or both nozzles.

Received in the piston chambers 48, 49 are valving pistons or plungers 53, 54, respectively, which are of shorter length than the respective chambers and are movable longitudinally therein. The pistons 53, 54 have center portions of reduced diameter, providing annular spaces within the chambers 48, 49. These chambers are at all times in communication with ports 55, 56 of the valve, communicating with conduits, 57, 58, respectively.

In their normal positions, the valve pistons 53, 54 are substantially centered in the chambers 48, 49 so that the left-hand end portions of the pistons close off passages 59 extending between the inlet port 51 and the respective chambers 48, 49. When one of the pistons shifts to the left in its chamber, the inlet port 51 is placed in communication with the annular chamber defined by the reduced portion of the piston and also with the port 55 or 56 which opens into the chamber. For example, if the upper piston 53 is shifted to the left, the port 55 and conduit 57 are placed in communication with the inlet port 51. At the same time, through an internal passage 53' in the piston 53, pressure fluid from the supply conduit 52 flows to the left-hand end of the valve piston 54 through a passsage 60 extending between the lefthand ends of the chambers 48, 49. This causes the lower piston 54 to shift to the right, connecting the port 56 and conduit 58 with an exhaust port 61 through an exhaust passage 62. Thus, with the valve pistons 53, 54 in the described positions pressure fluid flows out of the valve assembly through the conduit 57 and exhaust fluid flows into the valve assembly through conduit 58, the exhaust fluid then being directed from the valve assembly through exhaust port 61 and an exhaust conduit 63.

In accordance with the invention, the positions of the pistons 53, 54 are controlled by the pressure of fluid in the right-hand ends of the respective chambers 48, 49. Normally, pressure fluid from the supply conduit 52 flows into the right-hand ends of chambers 48, 49 and out through nozzles 44, 45 at an equal rate, so that the fluid pressure is the same in both chambers. If the valving arm 42 is shifted to lie closer to the end of one of the nozzles, the fluid flow through such nozzle is inhibited, while the fluid flow through the opposite nozzle is facilitated. This causes an increase of pressure in one chamber and a decrease in pressure in the other chamber, so that the pistons 53, 54 are shifted to direct pressure fluid through one of the conduits 57, 58. If the position of the valving arm 42 is changed so that the valving portion 43 lies close to the other nozzle the valving pistons 53, 54 will be shifted to opposite ends of their respective chambers to reverse the flow of fluid through conduits 57, 58.

In the illustrated form of the invention it is contemplaed that the casing 25, 31 and 32 and valve assembly 36 will be mounted in fixed position in the aircraft, with the axis of the casing vertically disposed when the aircraft is in level flight. It is also contemplated that under normal conditions the inertia element 20—24 will be vertically disposed within its casing, with the valving arm 42 disposed symmetrically in relation to the nozzles 44, 45.

Since the pivot pins 27 are disposed in offset relation to the axis 30, containing the center of gravity of the inertia element, the element will tend to rotate in a counerclockwise direction under the force of gravity. To counteract this unbalance, a small spring 64 is positioned between the arm 42 and the valve housing 37, providing a small clockwise rotational moment upon the inertia element to maintain the element in a vertical position, with the valving arm 42 centered between the nozzles 44, 45.

In some cases, particularly where the new control apparatus is incorporated in the control system of a pilotless aircraft equipped with a guidance system, automatic control means may be provided in connection with the spring 64 for changing the load factor command to the control system by altering the compresison of the spring. Alternatively, electro-magnetic or other means may be utilized to attract the arm 42 in a direction appropriate to bring about a desired control correction.

During flight of the aircraft, any acceleration of the aircraft about its pitch axis will cause the inertia element 23 to be displaced from its axially aligned position within the casing, moving the valving arm 42 toward one of the nozzles 44, 45 and away from the other. This unbalances the valving pistons 53, 54, as heretofore described, and causes a flow of fluid in the conduits 57, 58. As shown in FIG. 3, conduits 57, 58 are connected to opposite ends of the actuator 16. Accordingly, when relative rotation takes place between the inertia element 20—24 and its casing the actuator 16 is energized to urge the control lever 10 in one direction or the other, tending to reduce the acceleration forces acting on the aircraft.

Accordingly, if the aircraft tends to pitch upwardly, the casing surrounding the inertia element rotates in a clockwise direction, while the element, due to its high polar moment of inertia, tends to retain its initial disposition. The lower nozzle 45 of the valve assembly is thereby restricted, causing the lower piston 54 to shift to the left and the upper piston 53 to shift to the right. Pressure fluid is then directed through the conduit 58 to the rod end of the actuator 16, tending to draw the control lever 10 forwardly to correct or compensate for the upward pitching acceleration.

Accelerations of the aircraft in the direction of the axis 30, through the concentrated masses 22, are also sensed by the inertia device due to the offset relationship between the axis 30 and the pivotal axis 29. Thus, upward accelerations of the aircraft in the direction of the axis 30 will cause a counterclockwise rotational moment to be applied to the inertia member 20—24. This again will cause the arm 42 to restrict the lower nozzle 45 of the valve assembly and cause the control lever 10 to be urged forwardly to correct for the acceleration.

The relative compensatory control effects resulting from rotational and linear accelerations is determined by the magnitude of the offset between axes 29 and 30. If the offset is large, the apparatus will be highly sensitive to linear accelerations in the direction of the axis 30. If the offset is small, the apparatus will be relatively non-responsive to linear acceleration. If the inertia element is pivoted about an axis through its center of gravity, the apparatus will be responsive only to rotational accelerations.

To prevent sudden relative movements between the inertia member 20—24 and its casing, the casing is completely filled with hydraulic fluid. The interior of the casing is in open communication with the recess 39 of the valving housing 37, and accordingly, the streams of fluid from the nozzles 44, 45 are directed into the body of fluid trapped within the casing.

The relative movements of the inertia element and casing are further damped by means of disc-like elements 66, 67 at the upper and lower ends, respectively, of the tube 20, which are received closely within cylindrical recesses formed by plates 68, 69 secured to the side walls of casing caps 31, 32. The discs 66, 67 act within a partially trapped body of fluid to prevent any rapid relative movement between the inertia element and its casing.

At the extreme ends of the casing caps 31, 32 are openings 70, 71 communicating with conduits 72, 73, respectively. Conduits 72, 73 are connected to a suitable reservoir, not shown, of fluid and provide for a continuous flow of fluid through the casing at all times when the system is operating to maintain a uniform temperature within the casing and to prevent the accumulation of air or gas therein.

The new inertial control system is advantageously incorporated in high-speed aircraft for providing control force cues which are accurately responsive to the actual flight behavior of the aircraft. In modern jet aircraft, for example, slight movements of the servo-powered controls by the pilot may cause great stresses on the aircraft due to the large acceleration of forces produced. With conventional controls, the pilot cannot "feel" the actual effect of his control manipulations and cannot react with the swiftness required to correct for excessive accelerations. Accordingly, the new acceleration responsive control system senses the acceleration forces applied to the aircraft and immediately acts upon the controls of the aircraft to make correcting adjustments or to prevent the manipulation of the manual controls to an extent which would cause overstressing of the aircraft.

As will be readily apparent, an aircraft control system may incorporate a number of acceleration responsive devices of the type herein disclosed, disposed in various ways so as to sense acceleration forces applied in various directions. In this respect it will be understood that the illustrated control, wherein the inertia element 20—24 is vertically mounted within the aircraft, is merely illustrative since the sensing device can be mounted in any way, depending upon the acceleration forces to which the device is intended to respond.

One of the specific novel features of the invention is the use of an inertia element having a large polar moment of inertia and supported for rotation about an axis offset from the longitudinal axis of the element containing the center of gravity thereof. The device is thus sensitive to accelerations about its rotational axis as well as to linear acceleration along the principal axis of the element.

Another advantageous feature of the system is that it acts directly upon the control system of the aircraft through a sensitive hydraulic actuating arrangement so that immediate and accurate compensation is provided for overcontrolling of the aircraft.

The new system, while primarily intended for incorporation in the control systems of aircraft, either piloted or pilotless, is adaptable for controlling other controllable movable objects. It should be understood, therefore, that the specific apparatus herein illustrated and described is intended to be representative only, as certain changes may be made therein without departing from the clear teachings of the invention. Reference should therefore be made to the following appended claims in determining the full scope of the invention.

We claim:

1. An inertial control system for aircraft of the type having a control element for guiding the aircraft, comprising, in combination, a fluid actuator operatively connected to said control element and adapted when energized to exert a force thereon, an elongated inertia element having substantially equal concentrated mass members at each end, disposed on a common centerline, means for mounting said inertia element in said aircraft for pivotal movement about an axis midway between said concentrated mass member, said axis being slightly offset with respect to said centerline, resilient means acting on said inertia element tending to retain said inertia element in a predetermined position in said aircraft, and hydraulic valve means actuated by pivotal movements of said inertia element to energize said fluid actuator.

2. The inertial control system of claim 1, further characterized by said inertia element being mounted in said aircraft so that said concentrated mass members normally lie substantially along a vertical axis, said mounting means supporting said inertia element for pivoting movement about a normally horizontal axis transverse to the principal axis of said aircraft, said inertia element being adapted upon relative pivotal movement with respect to said aircraft, in response to accelerations of said aircraft in a vertical direction or about said horizontal axis, to actuate said valve means.

3. An inertial control system for aircraft of the type having a control element for guiding the aircraft, comprising, in combination, a fluid actuator operatively connected to said control element and adapted when energized to exert a force thereon, an elongated inertia element having substantially equal concentrated mass members at each end, means for mounting said inertia element in said aircraft for pivotal movement about an axis midway between said concentrated mass members, said axis being slightly offset with respect to the center of gravity of said element, resilient means acting on said inertia element tending to retain said inertia element in a predetermined position in said aircraft, and hydraulic valve means actuated by pivotal movements of said inertia element to energize said fluid actuator, said valve means comprising a valve member carried by said inertia element and having a pair of opposed valving surfaces, and a pair of oppositely disposed nozzles directed toward said valving surfaces, means to supply fluid under pressure to said nozzles, said valve member being operative to control the flow of fluid through said nozzles, and means operative in response to the relative rate of flow of fluid through said nozzles to energize said fluid actuator for exerting force on said control element tending to move said control element in a direction to reduce said accelerations.

4. The inertial control system of claim 1, further characterized by said control element comprising a manually operable element adapted to be moved by a pilot of the aircraft, said fluid actuator being operative when energized to exert forces on said control element in accordance with the flight behavior of said aircraft.

5. An inertial control system for aircraft of the type having a control element for guiding the aircraft, comprising, in combination, a fluid actuator connected to said control element and adapted when energized to exert a force thereon, an elongated inertia element comprising concentrated mass members disposed on a common centerline, said mass members being spaced apart to define an element having a high polar moment of inertia, means mounting said inertia element in said aircraft for limited rotational movement about an axis slightly offset from its centerline so as to be sensitive both to angular and linear accelerations, and hydraulic valve means actuated by pivotal movements of said inertia element to energize said fluid actuator.

6. The inertial control system of claim 5, further characterized by said inertia element comprising an elongated tube, and concentrated mass members carried at opposite ends of said tube.

7. The inertial control system of claim 5 in which the slight offset of said axis of rotation from the center of gravity of said inertia element causes said element to be much more sensitive to angular accelerations than to linear accelerations.

8. The inertial control system of claim 7, further characterized by said inertia element being disposed with the said longitudinal axis thereof extending in a substantially vertical direction, and further including resilient means acting on said inertia element to counteract the gravitational rotational moment acting thereon.

9. The inertial control system of claim 5, further characterized by said valve means being formed in part by a valving element carried by said inertia element.

10. The inertial control system of claim 9, further characterized by said valve means including pressure responsive elements, means to actuate said pressure responsive elements including a pair of oppositely disposed fluid nozzles, and means to regulate the flow of fluid through said nozzles including said valving element, said valving element comprising an arm carried by said inertia element and having a portion positioned between said nozzles.

11. An inertial control system for a controllable movable object of the type having a movable control element for controlling the direction of movement of the object, comprising, in combination, a fluid actuator connected to said control element and adapted when energized to exert a force thereon, an elongated inertia element comprising concentrated mass members located at each end of said element, said members being disposed on a common centerline, means mounting said inertia element in said object for limited rotational movement about an axis slightly offset from the centerline of said mass members so as to be sensitive both to angular and linear accelerations, and hydraulic valve means directly connected to and actuated by pivotal movement of said inertia element for energizing said fluid actuator.

12. An inertial control device comprising an elongated inertia element having concentrated mass members at each end, said mass members being separated to achieve a high polar movement of inertia about a pivot point located intermediate said mass members, whereby angular accelerations can be sensed to a high degree of sensitivity, means mounting said inertia element for limited rotational movement about said pivot point, a valving arm carried by said inertia member, a pair of fluid nozzles disposed on opposite sides of said valving member and directed toward said member, and fluid pressure responsive control means associated with said nozzles.

13. The inertial control device of claim 12, further characterized by said pivot point being slightly offset from the axis extending between said mass members and including the center of gravity of said inertia element, and further including resilient means acting against the gravitational rotational moment on said inertia element and normally holding said inertia element in a predetermined position.

14. The inertial control device of claim 12, further including a fluid-tight casing surrounding said inertia element and adapted to retain a supply of fluid.

15. The inertial control device of claim 14, further characterized by said inertia element having a piston-like damping element spaced from the rotational axis of said inertia element, and recess means in said casing adapted to closely receive said piston-like element.

16. An inertial control device comprising an inertia element comprising mass members disposed at spaced locations on a common centerline so as to have a high polar moment of inertia, means mounting said inertia element for limited rotational movement about an axis slightly offset from its centerline, said inertia element, because of said offset being slight, being more sensitive to angular accelerations than to linear accelerations, yieldable means acting on said inertia element and normally urging it into a predetermined operating position, and control means associated with said inertia element and operative in response to relative rotation between said inertia element and said mounting means.

17. The inertial control device of claim 16, further characterized by said control means comprising a fluid valve having a valving element carried by said inertia element.

18. The inertial control device of claim 17, further characterized by said fluid valve comprising a pair of oppositely disposed fluid nozzles, and said valving element comprising an arm secured to said inertia element and having a portion positioned between said nozzle.

19. In an inertial control system for controlling the path of travel of a movable vehicle, an elongated inertia element utilizing a pair of concentrated mass members disposed on a common centerline, mounting means for supporting said inertia element for pivotal movements about an axis intermediate said mass members, said inertia element having a high polar moment of inertia about said axis, so as to be highly sensitive to angular accelerations, said axis being slightly offset with respect to the centerline of said inertia element, whereby it is only slightly sensitive to linear accelerations, and means actuated by movements of said inertia element about said axis for supplying control information to be utilized for controlling the movements of said vehicle.

References Cited in the file of this patent

UNITED STATES PATENTS

| | | |
|---|---|---|
| 1,154,396 | Hayot | Sept. 21, 1915 |
| 2,169,982 | Von Manteuffel | Aug. 15, 1939 |
| 2,302,670 | Buchanan | Nov. 24, 1942 |
| 2,394,384 | Horstmann | Feb. 5, 1946 |
| 2,492,990 | Hanna | Jan. 3, 1950 |
| 2,548,481 | Knowler | Apr. 10, 1951 |
| 2,632,455 | Lynn | Mar. 24, 1953 |
| 2,652,812 | Fenzi | Sept. 22, 1953 |
| 2,739,771 | Meredith | Mar. 27, 1956 |
| 2,797,911 | Montgomery | July 2, 1957 |
| 2,812,398 | Mickman | Nov. 5, 1957 |

FOREIGN PATENTS

| | | |
|---|---|---|
| 707,388 | Great Britain | Apr. 14, 1954 |